June 30, 1936.  J. T. MIDYETTE, JR  2,045,790
UNIT HEATER CONTROL
Filed April 23, 1934
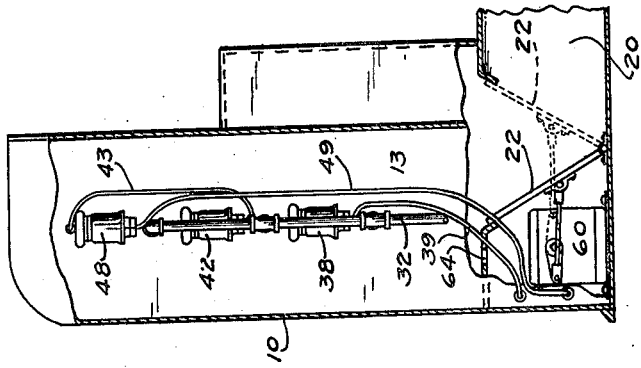
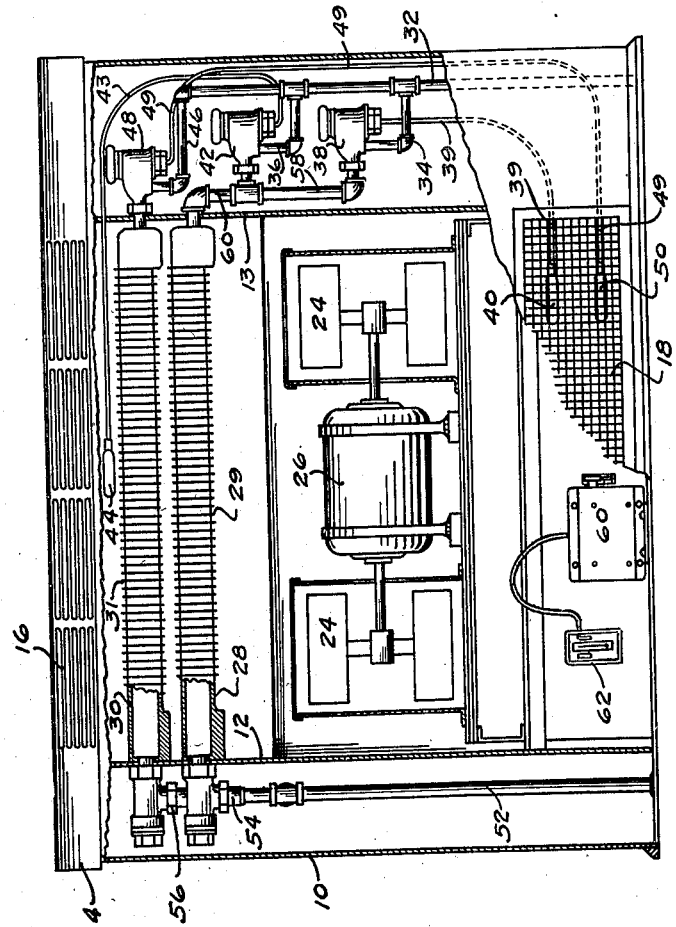
Inventor
John T. Midyette Jr.
By his Attorney
George H. Fisher Patented June 30, 1936

2,045,790

UNITED STATES PATENT OFFICE 2,045,790

UNIT HEATER CONTROL

John T. Midyette, Jr., Brooklyn, N. Y., assignor to Minneapolis-Honeywell Regulator Company, Minneapolis, Minn., a corporation of Delaware Application April 23, 1934, Serial No. 721,925

6 Claims. (Cl. 236—38)

The present invention relates to a heating and ventilating control system and more particularly to a control system for the so-called unit heaters and ventilators. Such unit heaters and ventilators are usually designed to be installed directly in the space to be heated and ventilated and consist of an inclosure or casing having an air outlet or discharge opening in the top and having two air inlet openings in or near the bottom, one of which connects with the outside air and the other of which connects with the space. They are equipped with a blower usually located near the bottom and a radiator or radiators usually located near the top. They are also usually equipped with an air damper, generally known as a mixing damper, which can be adjusted to close off or partially close off either the outside or the inside air inlet opening. In many installations, especially in school buildings, it is customary to adjust the air damper to take in all outside air or mostly outside air during at least a portion of time.

The use of unit heaters and ventilators presents a number of problems especially when it is attempted to control the radiator with a thermostat located in the space. If the air damper is adjusted to take in all outside air and the temperature of this outside air is considerably below freezing and the radiator is then turned off even for a short period of time the radiator is subject to freezing. Also, this cold air passing over the unheated radiator into the space causes uncomfortable cold drafts.

It has been proposed to equip these unit heaters and ventilators with two radiators, commonly known as "double bank unit heaters", and controlling one of the radiators by an outside thermostat and controlling the other radiator by a space thermostat. This arrangement is sometimes unsatisfactory for if the outside temperature is relatively high, it is impossible to have both radiators on even though the space temperature is low. Also, the space may be overheated by the one radiator that is controlled by the outside thermostat because there are factors other than outside temperature which determine the amount of heat required for the space.

It has been proposed to control a double bank unit heater and ventilator such as that just described by controlling the radiator over which the circulated air first passes by a thermostat located between the two radiators, and controlling the radiator over which the air last passes by a thermostat located in the space. This type of control is unsatisfactory especially when used in school buildings for if the thermostat controlling the first radiator is set to maintain a proper minimum temperature to prevent cold drafts and to prevent freezing, it will keep this radiator closed most of the time during the period in the morning when the space temperature is being increased from the low night temperature to the proper day temperature. This means that the unit cannot be operated at its maximum capacity even though the space temperature is low.

It is an object of the present invention to provide a heating and ventilating control system which will at all times deliver air above a definite minimum temperature and will when required deliver air at a maximum temperature.

Another object of the invention is to provide a control system for unit heaters and ventilators which will at all times deliver air to the space above a definite minimum temperature independent of the space temperature or the outside temperature and will deliver air to the space at a maximum temperature when the space temperature is below a predetermined value.

Another object of the invention is to provide a control system for double bank unit heaters and ventilators, whereby both radiators are thermostatically controlled in accordance with space temperature and one of the radiators is separately and independently thermostatically controlled in accordance with the temperature of the discharged air.

Another object of the invention is to provide a control system for double bank unit heaters and ventilators whereby the supply of steam to both radiators is controlled by thermostatic means responsive to a temperature condition and a separate supply of steam to the radiator over which the air first passes is controlled by thermostatic means responsive to another temperature condition.

Another object of the invention is to provide a control system for unit heaters and ventilators whereby the unit will at all times deliver air above a definite minimum temperature and will operate at full capacity when the space temperature is below a predetermined value.

Another object of the invention is to provide thermostatic means for the mixing damper of a unit heater and ventilator which will close the outside air inlet opening if the space temperature falls below a predetermined value, in combination with the above described systems.

Another object of the invention is to provide an improved automatic control system for heaters and ventilators.

Other objects and advantages reside in certain novel arrangement and combination of the parts which will be hereinafter more fully described and particularly pointed out in the appended claims, reference being had to the accompanying drawing forming a part of this specification, and in which:

Fig. 1 is a front elevation of a unit heater and ventilator with a part of the outside casing broken away to show the location of the various elements.

Fig. 2 is an end elevation of the unit heater and ventilator shown in Fig. 1 with a part of the outside casing and a part of an end partition broken away to show the location of the various elements.

Referring to the drawing, the numeral 10 indicates an outer casing enclosing all the mechanism of the unit heater and ventilator. The casing 10 is equipped with inside end partitions 12 and 13 the purpose of which will become apparent as the description proceeds. The casing 10 is also equipped with a cover 14 having a series of openings 16 in the form of a grill. In the lower part of the unit heater and ventilator there are two openings, one of which connects with the space in which the unit heater and ventilator is located by means of a grill 18 in the front of the casing 10, and the other of which connects with the atmosphere outside the space to be heated and ventilated by means of a boot 20 on the back of the casing 10. These two openings are controlled by a mixing damper 22 which permits air to enter the casing 10 from either the space or from the outside or permits some air to enter from both the inside and outside depending upon its position. The grills 16 and 18 and the boot 20 all connect with the casing 10 between the end partitions 12 and 13.

Air is circulated through the casing 10 by means of blowers 24 which are operated by an electric motor 26. The electric motor 26 is usually operated continuously at least during the time that the space is being maintained at the normal day temperature. The blowers 24 draw air into the casing 10 through the grill 18 or the boot 20, or through both depending upon the position of the mixing damper 22, and then discharge this air through the grill 16 into the space to be heated and ventilated. If the damper 22 is in the full line position as shown in Fig. 2, the blowers 24 will draw all outside air into the casing 10 and discharge this air through the grill 16 into the space to be heated and ventilated. If the damper 22 is in the dotted line position as shown in Fig. 2, the blowers 24 will draw all inside air from the space to be heated and ventilated through the grill 18 and discharge this air through the grill 16 back into the space. If the damper 22 is adjusted to the mid-position the blowers 24 will draw into casing 10 some outside air and some space air and discharge this mixed air through the grill 16 into the space to be heated and ventilated.

Near the top of the casing 10 and in between the end partitions 12 and 13 there is located a lower or preheating steam radiator 28 equipped with radiating fins 29. Directly above the preheating radiator 28 there is located an upper or reheating steam radiator 30 equipped with radiating fins 31. The radiators 28 and 30 are in the path of the circulated air between the blowers 24 and the grill 16 and are arranged to heat the air that is circulated through the casing 10. The radiators 28 and 30 may be of any standard commercial design well-known in the art for this purpose and constitute no part of this invention.

Steam is supplied to the lower radiator 28 from a steam supply pipe 32 by means of branch pipes 34 and 36. In the branch pipe 34 there is located a thermostatic valve 38 for automatically controlling the admission of steam to the radiator 28 in accordance with some temperature condition. The thermostatic valve 38 is equipped with a copper tube 39 leading to a temperature sensitive volatile filled bulb 40 which is located near the grill 18 in the path of the incoming air from the space. Thermostatic valves of this type are well-known in the art for this purpose and constitute no part of this invention. In the branch pipe 36 there is located a similar thermostatic valve 42 which also automatically controls the admission of steam to the radiator 28 in accordance with some other temperature condition. The thermostatic valve 42 is equipped with a copper tube 43 leading to a temperature sensitive volatile fill bulb 44 which is located in the path of the circulated air between the upper radiator 30 and the grill 16.

Steam is supplied to the upper radiator 30 from the steam supply pipe 32 by means of a branch pipe 46. In the branch pipe 46 there is located a thermostatic valve 48 for automatically controlling the admission of steam to the radiator 30 in accordance with some temperature condition. The thermostatic valve 48 is equipped with a copper tube 49 leading to a temperature sensitive volatile filled bulb 50 which is located near the grill 18 in the path of the incoming air from the space.

The condensate from the radiators 28 and 30 is taken away by means of a return pipe 52 which has a branch pipe 54 connecting with the outlet of radiator 28 and a branch pipe 56 connecting with the outlet of radiator 30.

The passage of steam through the lower radiator 28 is as follows: steam supply pipe 32, branch pipe 34, thermostatic valve 38, pipe 58, pipe 60, radiator 28, return branch pipe 54, and return pipe 52. There is a separate supply of steam for radiator 28 which is as follows: steam supply pipe 32, branch pipe 36, thermostatic valve 42, pipe 60, radiator 28, return branch pipe 54, and return pipe 52. The passage of steam through the upper radiator 30 is as follows: steam supply pipe 32, branch pipe 46, thermostatic valve 48, radiator 30, return branch pipe 56, and return pipe 52.

The mixing damper 22 may be manually adjusted to any desired position or it may be controlled by a motor 60. The motor 60 may be remotely controlled by a manual switch or automatically controlled by a thermostat 62. The thermostat 62 may be located to control the damper in accordance with any desired temperature condition. However, it is here located near the grill 18 in the path of the incoming air from the space. This motor 60 may be of any standard commercial design which rotates 180° upon the making of one contact and rotates the other 180° upon the making of another contact. The thermostat 62 which controls the motor 60 may also be of any standard commercial design which is arranged to make one contact on a temperature fall and make another contact on a temperature rise. The motor 60 and the thermostat 62 may be of any standard commercial design well-known in the art for this purpose and constitute no part of this invention.

When the damper 22 is in the full line position shown in Fig. 2, the blowers 24 will still take in some return space air through the grill 18 and through a series of small openings 64. The purpose of having these small openings 64 is to permit the blowers 24 to draw in a small amount of space air over the thermostats 40, 50 and 62 in order that they will respond more readily to changes in the space temperature.

Operation

The temperature of the air returning from the space and entering the grill 18 may be slightly lower than the average temperature of the space, but any change in the space temperature will result in a change in the temperature of the return air, therefore the thermostatic bulbs 40 and 50 and the thermostat 62 which are located in the path of the return air entering the grill 18 may be considered as responding to space temperature changes.

It has been found satisfactory to set the thermostat 62 at a temperature of 65° F. With this setting of the thermostat 62, the damper 22 will remain in the full line position as shown in Fig. 2 for all temperatures above 65° F. which will permit the blower 24 to take in all outside fresh air through the boot 20 and deliver it to the space through the grill 16. Also with this setting the thermostat 62 will operate the motor 60 and shift the damper 22 to the dotted line position as shown in Fig. 2 any time the space temperature falls below 65° F. which will permit the blowers 24 to take in all inside air through the grill 18 and discharge it back into the space through the grill 16. The thermostat 62 may, however, be set to operate the damper at any other desired temperature.

The thermostatic valves 38 and 48 may be adjusted so that their temperature sensitive bulbs 40 and 50 will be responsive to any desired space temperature. However, it has been found satisfactory to set the thermostatic valve 38 at 70° F. and the thermostatic valve 48 at 68° F. With these settings, as the space temperature falls, the lower radiator 28 will be supplied with steam through the thermostatic valve 38 as soon as the space temperature falls below 70° F. and the upper radiator 30 will be supplied with steam through the thermostatic valve 48 as soon as the space temperature falls below 68° F. On the other hand, as the space temperature rises, the thermostatic valve 48 will close off the supply of steam to the upper radiator 30 as soon as the space temperature rises above 68° F. and the thermostatic valve 38 will close off the supply of steam to the lower radiator 28 as soon as the space temperature rises above 70° F. It is therefore evident that the upper radiator 30 is only used to reheat or boost the temperature of the discharge air when the space temperature falls below a predetermined value which in this case has been taken as 68° F. The thermostatic valves 38 and 48 may be set to respond to any other desired space temperature but the temperature setting of thermostatic valve 48 should always be slightly lower than the temperature setting of the thermostatic valve 38 for reasons which will be pointed out hereinafter.

The thermostatic valve 42 may be adjusted so that its temperature sensitive bulb 44 will respond to any desired discharge air temperature. However, it has been found satisfactory to set the thermostatic valve 42 at 65° F. With this setting, the thermostatic valve 42 will supply steam to the radiator 28 when the temperature of the discharge air falls below 65° F. and will close off the supply of steam when the temperature of this discharge air rises above 65° F.

It should be noted that steam is supplied to the lower radiator by either or both of the thermostatic valves 38 and 42. With this arrangement, the thermostatic valve 42 supplies steam to the radiator 28 to maintain the temperature of the discharge air above 65° F. to avoid cold drafts in the space and to prevent the radiators from freezing in cases where the incoming air through the boot 20 is considerably below freezing temperature, and the thermostatic valve 38 supplies steam to the same radiator any time the space temperature is below the setting of the thermostatic valve 38.

This system therefore maintains at least a definite minimum discharge air temperature independent of any other condition, and in addition both radiators will be supplied with steam and therefore operate at full capacity any time the space temperature is below the setting of the thermostatic valves 38 and 48 independent of the discharge air temperature.

These thermostatic valves 38, 42, and 48 are of the throttling type and usually require a temperature change of at least one or two degrees F. to move the valve from full open position to closed position or from closed position to full open position. Such thermostatic valves are, however, quite satisfactory even if it requires five to ten degrees F. temperature change to move the valve from one extreme position to the other.

The control system has been shown as applied to a unit heater and ventilator located in the space to be heated and ventilated but it is equally adapted to control a heater and ventilator wherein the radiators and the blower are located outside the space to be heated and ventilated. This control system is also equally adapted to control heaters and ventilators wherein the radiators and blower are arranged in a horizontal position instead of a vertical position. This control system is also adapted to the control of heaters and ventilators having only one radiator. I therefore intend to be limited only by the scope of the appended claims.

Having thus described my invention, what I claim as new and desire to secure by United States Letters Patent is:

1. A heating and ventilating system of the class described comprising in combination, a casing having an air outlet connecting with an enclosed space and having an air inlet opening connecting with the outside air, means for circulating air through the casing, first and second radiators in the casing arranged to have the circulated air pass over the first radiator and then over the second radiator, means responsive to the temperature of the space and to the temperature of the air leaving the casing controlling the admission of heat to the first radiator, and means responsive solely to the temperature of the space controlling the admission of heat to the second radiator.

2. A heating and ventilating system of the class described comprising in combination, a casing located inside an enclosed space to be heated and ventilated, said casing having an air outlet opening in the top and having air inlet openings in the bottom, one of said inlet openings connecting with the outside air, means within the casing for circulating air through the casing, upper and lower radiators in the casing, means responsive to the temperature of the space and to the temperature of the air leaving the casing controlling the admission of heat to the lower radiator, and means responsive solely to the temperature of the space controlling the admission of heat to the upper radiator.

3. A heating and ventilating system of the class described comprising in combination, a casing located inside an enclosed space to be heated and ventilated, said casing having an air outlet opening in the top and having air inlet openings in the bottom, one of said inlet openings connecting with the outside air, means within the casing for circulating air through the casing, upper and lower radiators in the casing, means responsive to the temperature of the space and to the temperature of the air after it has passed over at least one of the radiators controlling the admission of heat to the lower radiator, means responsive solely to the temperature of the space controlling the admission of heat to the upper radiator, and means responsive to the temperature of the air entering one of said inlet openings controlling the admission of outside air.

4. A radiator control of the class described comprising, a radiator for heating a space and arranged to have the air in the space circulate over the radiator, a thermostat responsive to the temperature of the air before it passes over said radiator controlling the supply of a heating medium fluid to the radiator, and a thermostat responsive to the temperature of the air after it passes over said radiator independently and additionally controlling the supply of said fluid to the radiator whereby either thermostat may control the supply of heating medium fluid irrespective of the control of the other thermostat.

5. A radiator control of the class described comprising, a pair of radiators for heating a space and arranged to have the air in the space circulate successively over the radiators, thermostatic means responsive to the temperature of the air before it passes over said radiators controlling the supply of a heating medium fluid to the radiators, and thermostatic means responsive to the temperature of the air after it passes over said radiators independently of additionally controlling the supply of said fluid to one of said radiators whereby either thermostatic means may control the supply of heating medium fluid irrespective of the control of the other thermostatic means.

6. A radiator control of the class described comprising, a casing having air inlet and outlet openings, said outlet opening connecting with a space to be heated, a first radiator in said casing between said openings, a second radiator in said casing between said first radiator and said outlet opening, a heating medium fluid for heating said radiators, first thermostatic means arranged to admit said fluid to said first radiator when the temperature of the air at said outlet opening falls below a definite minimum value, second thermostatic means arranged to admit said fluid to said first radiator when the space temperature falls below a predetermined value, and third thermostatic means arranged to admit said fluid to said second radiator only when the space temperature falls to a value below said predetermined value.

JOHN T. MIDYETTE, Jr.